US006907542B2

(12) United States Patent
Barthel

(10) Patent No.: US 6,907,542 B2
(45) Date of Patent: Jun. 14, 2005

(54) SYSTEM, DEVICE AND METHOD FOR DETERMINING THE RELIABILITY OF DATA CARRIERS IN A FAILSAFE SYSTEM NETWORK

(75) Inventor: Herbert Barthel, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 617 days.

(21) Appl. No.: 09/908,110

(22) Filed: Jul. 18, 2001

(65) Prior Publication Data

US 2002/0010874 A1 Jan. 24, 2002

Related U.S. Application Data

(63) Continuation of application No. PCT/DE00/00118, filed on Jan. 13, 2000.

(30) Foreign Application Priority Data

Jan. 26, 1999 (DE) .................................... 299 01 302 U
May 25, 1999 (EP) ............................................ 99110157

(51) Int. Cl.⁷ .............................................. G06F 11/00
(52) U.S. Cl. ............................................. 714/4; 714/704
(58) Field of Search .............................. 714/4, 48, 704, 714/706, 749; 709/224

(56) References Cited

U.S. PATENT DOCUMENTS

| 5,138,616 | A | | 8/1992 | Wagner, Jr. et al. | ......... 371/5.1 |
| 5,357,517 | A | * | 10/1994 | Takebe | ....................... 714/704 |
| 5,471,671 | A | | 11/1995 | Wang et al. | .............. 455/226.2 |
| 5,680,404 | A | | 10/1997 | Gray | .......................... 371/5.1 |
| 5,761,429 | A | * | 6/1998 | Thompson | ................... 709/224 |
| 5,924,122 | A | * | 7/1999 | Cardoza et al. | ............. 711/150 |
| 5,987,629 | A | * | 11/1999 | Sastry et al. | ................... 714/48 |
| 6,098,179 | A | * | 8/2000 | Harter, Jr. | ....................... 714/4 |
| 6,321,338 | B1 | * | 11/2001 | Porras et al. | ............... 713/201 |
| 6,442,708 | B1 | * | 8/2002 | Dierauer et al. | .............. 714/25 |
| 6,629,261 | B1 | * | 9/2003 | Chintada et al. | ............... 714/4 |
| 6,795,941 | B2 | * | 9/2004 | Nickels | ...................... 714/706 |
| 2002/0019956 | A1 | * | 2/2002 | Carter et al. | ................... 714/4 |
| 2002/0083378 | A1 | * | 6/2002 | Nickels | ...................... 714/706 |
| 2003/0046601 | A1 | * | 3/2003 | Teng | ............................. 714/4 |
| 2003/0187934 | A1 | * | 10/2003 | Nishikawa et al. | ......... 709/206 |

FOREIGN PATENT DOCUMENTS

WO          WO 95/26094         9/1995

OTHER PUBLICATIONS

Copy of international search report in German designating at p. 5 specific lines and columns for references above, where Seite=page, Zeile=line, Absatz=paragraph, and Spalte=column.

* cited by examiner

Primary Examiner—Scott Baderman
Assistant Examiner—Anne L. Damiano
(74) Attorney, Agent, or Firm—Foley & Lardner LLP

(57) ABSTRACT

A network node, a system and method for facilitating safety in a communication network of a safety-related system, involving the means to accomplish the steps of receiving at a network note at least one packet, forming a relative measure of data corruption, and initiating a failsafe reaction when said relative measure of data corruption exceeds specifiable safety parameters.

11 Claims, 3 Drawing Sheets

SYSTEM, DEVICE AND METHOD FOR DETERMINING THE RELIABILITY OF DATA CARRIERS IN A FAILSAFE SYSTEM NETWORK

CROSS REFERENCE TO RELATED APPLICATION

This is a continuation of International Application PCT/DE00/00118, which has an international filling date of Jan. 13, 2000. The international application was not published in English under PCT Article 21 (2).

BACKGROUND OF THE INVENTION

The present invention relates generally to safety-related (or "failsafe") systems comprising communication systems. More particularly, the present invention relates to methods and devices for detecting communication errors online and initiating failsafe reactions, designed to prevent workplace accidents, in response to intolerable levels of error.

In a failsafe system, the error-free operation of the underlying communication system contributes to the overall safety of the people and property using the system. This is, for example, important in manufacturing systems, where the malfunction of heavy equipment could cause severe personal injury or property damage. For instance, a manufacturing system may consist of a communications network with a CPU, a communication medium, a control device coupled with the communication medium, and a piece of manufacturing equipment controlled by the control device. The CPU in turn controls the control device. Because the output of the manufacturing equipment is affected by the instructions it receives from its controller and transitively from the communications medium, errors produced by the communications medium can affect the operation of the machinery and the overall safety of the system. A truly failsafe system, therefore, must incorporate some means to control errors generated by the communication medium. The need for failsafe communications can easily be seen in manufacturing, waste disposal, medicine, transportation, military and other applications.

In failsafe systems, having regard to a communication between failsafe (EN 61 508) peripheral units and failsafe CPU units, high demands must be made on these units. E.g., the "Berufsgenossenschaftliche Institut fü Arbeitssicherheit" [Institute for Safety at Work for Professional Associations] assumes that the bit error probability in communication media is adequately on average in the order of magnitude of $10^{-2}$ (see "Entwurf eines Grundsatzes für die Prüfung und Zertifizierung von Bussystemen für die Übertragung sicherheitsrelevanter Nachrichten [Design of a principle for checking and certifying bus systems for the transmission of safety-related messages] of 15.3.99), which necessitates very extensive safety measures. Realistic (bit) error probabilities are less than $10^{-5}$. Accordingly, the present invention reduces the required safety measures without loss of transmission reliability by monitoring the error probability online.

Further, the performance of failsafe systems is governed by various regulations and standards which are forthcoming or already in place. For example, the International Electrotechnical Commission has published IEC 61508 (hereby incorporated by reference), a standard aimed at software performance for safety-related or failsafe systems. IEC 61508 provides for different levels of safety referred to as Safety Integrity Levels 1-4 (SIL 1-4) (NOTE DIN 19250 uses AK levels 1-8 with similar meaning). The higher the SIL level the more critical the safety and therefore an increased need to reduce risk. IEC 61508 prescribes data corruption rates for safety-engineered systems of less than $10^{-6}$–$10^{-5}$ errors per hour for SIL 1, less than $10^{-7}$–$10^{-6}$ errors per hour for SIL 2, and less than $10^{-8}$–$10^{-7}$ for SIL 3.

Thus, there is a need for failsafe communication systems in many industries. Further, there is a need for communication systems to maintain certain levels of data integrity to comply with standards and prevent accidents. Still further, there is a need for communication system to monitor their own data integrity and react to integrity losses to prevent accidents. Still further, there is a need to obviate the use of extensive anti-corruption measures that can be required of communications networks serving failsafe systems.

BRIEF SUMMARY OF THE INVENTION

Briefly, the invention relates to system, a network node and a method, in which data packets are transmitted between network nodes, said data packets in each case exhibiting a data protection value, and said nodes checking the data protection value of said data packets for detecting corruption of received data packets.

One embodiment of the invention concerns a system for failsafe communication in a safety-related network utilizing data packets for communication, comprising a host; at least two further network nodes communicatively linked to said host, such that said at least two further network nodes are capable of transmitting data to said host; wherein each of the at least two further network nodes forms a relative measure of data corruption and transmits said relative measures to said host; wherein said host receives said relative measures of data corruption and combines said relative measures of data corruption into an overall relative measure of data corruption for at least part of an overall system; and wherein said host initiates a failsafe reaction should said overall relative measure of data corruption exceed a specifiable limit.

Yet another embodiment of the invention concerns a network node to which data packets can be transmitted by another network node, said data packets in each case exhibiting a data protection value and said node checking the data protection value of the data packet for detection of corruption in a received data packet or for detecting addressing errors, wherein the network node is provided with means which, within a predeterminable time interval, determine the number of corrupted data packets and number of uncorrupted data packets and trigger a safety-oriented response if the ratio between corrupted and uncorrupted data packets reaches or exceeds a predeterminable value, within a predeterminable time interval or for a predeterminable number of data packets, determine the number of corrupted data packets or the number of uncorrupted data packets and trigger a safety-oriented response if the number determined reaches or exceeds a predeterminable value.

An additional embodiment of the invention concerns a method for facilitating safety in a communication network of a safety-related system, comprising the steps of evaluating, for at least two network node pairs, a relative measure of data corruption; transferring information concerning said relative measure to a host; generating at the host an overall measure of data corruption in a system; and initiating a failsafe reaction if said overall measure of corrupted packets in a system exceeds a specifiable limit.

Still another embodiment concerns a network node which can receive data packets through another network node, said data packets being confirmed by a confirmation receipt from the receiver and featuring a data integrity value, and which in order to recognize corruption in received data packets or address errors checks packet data protection values, wherein said network node is equipped with means which evaluate the number of corrupted and uncorrupted data packets or the number of corrupted data packets/receipts per time unit and/or receipts within a specified (or specifiable) time interval or during a specified (or specifiable) number of transmitting packets, and which trigger a failsafe reaction, should the relationship of corrupted to uncorrupted data packets or the number of corrupted data packets reach or exceed a specifiable limit.

Still a further embodiment involves a communications method for transmitting data packets featuring data integrity values, whose receipt is confirmed by the receiver, between network nodes that check the data integrity values of the packets in order to recognize corrupted data, wherein the number of corrupted and uncorrupted data packets and/or corrupted receipts with a specified (or specifiable) time interval or during a specified (or specifiable) number of transmitted packets is evaluated or that only the number of corrupted data packets/receipts evaluates and a failsafe reaction is triggered, should the relationship of corrupted to uncorrupted data packets or the number of corrupted data packets reach or exceed a specifiable limit.

Yet another embodiment concerns a communications method for communication between a central network node, at least one data-delivering network node and at least two data receiving network nodes, wherein both the at least one data delivering network node as well as the at least two data receiving network nodes are communicatively connected to the central network node, and wherein each data receiving network node transmits to the central network node a measurement of the number of currently appearing or past errors or a measure of the probability/rate of the appearance of a mistake, and wherein the central network node sums the incoming measurements, and—wherein a failsafe reaction is triggered when the sum reaches or exceeds a specified or specifiable boundary value.

A detailed description of the invention will be presented by means of the drawings, which will allow the illustration of the various embodiments of the invention and its advantages.

BRIEF DESCRIPTION OF THE DRAWINGS

The invention is illustrated by way of example and not limitation in the accompanying drawings, in which like references indicate similar elements and in which.

DETAILED DESCRIPTION OF THE INVENTION

Figure 1:
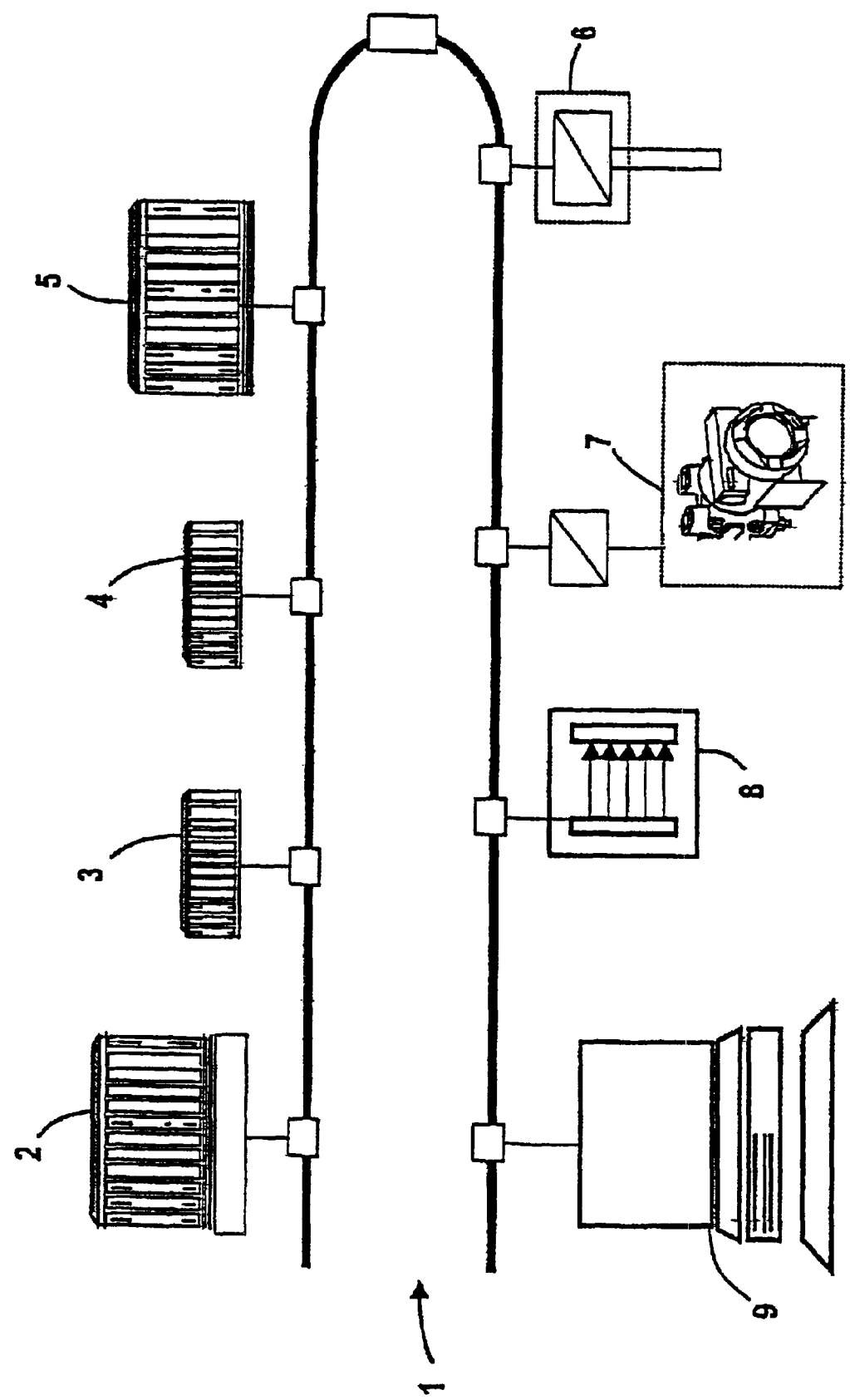
FIG. 1 shows a network with several network nodes operating in a failsafe system.

Generally, a system, an apparatus and method for monitoring data integrity online in safety-related (or "failsafe") systems incorporating communications systems are described. In the following description, for purposes of explanation, numerous specific details are set forth in order to provide a thorough understanding of exemplary embodiments. It will be evident in certain instances, however, to one skilled in the art that the present invention may be practiced without these specific details. In other instances, devices are shown in block diagram form in order to facilitate description of the exemplary embodiments.

Certain embodiments of the invention may be briefly summarized as follows. Cyclic Redundancy Check error detection or an equivalent technique, which is generally carried out in any case, can be used to evaluate the residual bit error probability of an overall system and/or the bit error probability of the communication on a transmission medium between network nodes. A failsafe reaction is then triggered by certain embodiments of the invention, if within a specified (or specifiable) time interval either a specified (or specifiable) relationship between corrupted and uncorrupted packets (or data confirmation receipts) is reached or exceeded, or a specified (or specifiable) sum of corrupted packets or receipts is reached or exceeded. Thus, a relative measure of data corruption is formed during operation.

The embodiments of the present invention are based on, among other things, the purpose of creating a network node of the type initially mentioned and, respectively, a corresponding communication method, which node or which method makes it possible to provide online proof of safety with regard to a bit error probability or input error probability and/or residual error probability.

For this purpose, the number of corrupted and uncorrupted data packets and/or corrupted acknowledgments is determined in operation. If necessary, it is also possible to determine only the number of corrupted or only the number of uncorrupted data packets and/or acknowledgments and additionally the total number of data packets transmitted so that the complementary value in each case can be determined mathematically at any time. In operation, either the ratio between corrupted and uncorrupted data packets and/or acknowledgments or the number of corrupted data packets and/or acknowledgments is compared with a predetermined or predeterminable threshold value either continuously or in accordance with a fixed strategy. If this threshold value is reached or exceeded, a failsafe reaction is triggered.

If a corrupted data packet is determined, a failsafe reaction is not necessarily initially triggered. Instead, the failsafe reaction is triggered during the monitoring of the ratio between corrupted and uncorrupted data packets and/or acknowledgments (or equivalent relative measure of data corruption), if the number of corrupted data packets and/or acknowledgments in the ratio to the number of uncorrupted data packets and/or acknowledgments exceeds a predetermined or predeterminable threshold value during a predetermined or predeterminable time interval.

During the monitoring of the number of corrupted data packets and/or acknowledgments, the error response is triggered if during a predetermined or predeterminable further number of data packets, e.g. during a further 65,000 data packets, a further data packet is corrupted. As failsafe reaction, it may be provided, for example, that the outputs of an output unit of a technical device to be controlled are switched off. Numerous other possible failsafe reactions will be apparent to those of skill in the art.

One embodiment is known from the Siemens catalog pg. 70, chapter 14, 1999 edition. As determined by an error check algorithm (Cycle Redundancy Check), the transmitting network node, before transmitting a data packet, provides this data packet with a CRC value which is evaluated by the receiving network user which, as a result, detects whether the received data packet has been corrupted on the transmission link (a number of other error detection schemes in addition to CRC are available, and will be apparent to a person of ordinary skill in the art).

The exemplary embodiments are further illustrated through the Figures.

FIG. 1 is a diagram showing network 1, which comprises network nodes 2 through 9. The network nodes 2, 3, 4 and 5 comprise, e.g., failsafe CPUs and/or analog and/or digital input-output and/or communication units of a stored control program for the control of an technical device, e.g., technical device 7.

In one embodiment, network nodes 2 through 9 feature means in the form of driver chips (not shown) that are capable of performing error checking. For purposes of explanation, CRC ("Cyclic Redundancy Checking", in itself a known technique) will be used throughout the description of the embodiments as an exemplary error checking method.

In the arrangement shown in FIG. 1, the error check algorithm of the respective driver chips generates protection data in the form of a CRC (or equivalent) value which is transmitted together with the payload of a data packet. The driver chip of a receiving unit also forms a CRC value from the payload of a received data packet and compares this value with the received CRC value.

In a case where the CRC values do not match, a corrupted data packet or an addressing error is indicated. Reasons for the corruption of the data packet can be errors in the so-called "gray channel". This gray channel is a standard single-channel communication device which is used by the safety profile and may contain a variety of communication components.

The driver chips in this arrangement can be parameterized e.g. for an online proof of safety with regard to a predeterminable residual error probability, in such a manner that they determine the number of corrupted and uncorrupted data packets, e.g. within a predeterminable time interval (or form an equivalent relative measure of data corruption), and trigger a failsafe reaction if the ratio between corrupted and uncorrupted data packets reaches a value corresponding to this residual error probability.

The driver chips can also be parameterized in such a manner that they determine, instead of the ratio between corrupted and uncorrupted data packets within a predeterminable time interval, the number of corrupted data packets during the transmission of a predetermined or predeterminable number of data packets and then trigger a failsafe reaction if this number of corrupted data packets reaches or exceeds a value corresponding to this residual error rate.

In the case where the predetermined residual error rate/probability is exceeded during the communication between two units, this is indicated by the corresponding driver chip by means of a failsafe reaction, e.g. in the form of a shutdown of an output unit of a technical device.

Figure 2:
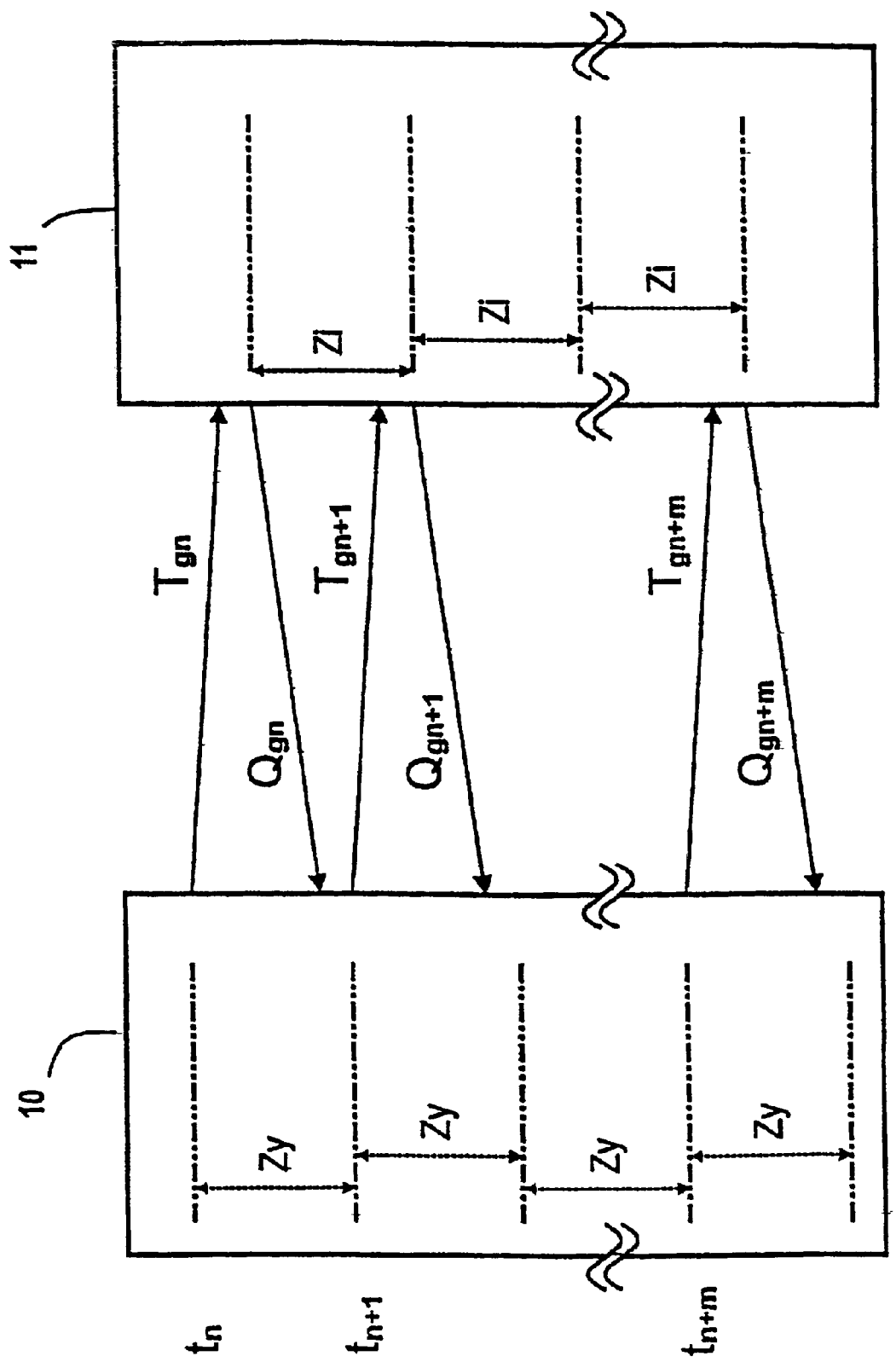
FIG. 2 shows an example of the monitoring of a data packet system.

FIG. 2 shows the monitoring of data packet transmission between CPU 10 and output device 11. In FIG. 2, time advances from the top of the page to the bottom, with each particular point in time being represented by a lower case "t", e.g., $t_n$, $t_{n+1}$, $t_{n+m}$. $Z_y$ indicates the time interval between transmissions from CPU 10. $Z_i$ indicates the time interval between transmissions from output unit 11. $T_{gn}$ through $T_{gn+m}$ represent packet transmissions from CPU 10. $Q_{gn}$ through $Q_{gn+m}$ represent receipt transmissions sent from output unit 11 to CPU 10 to verify receipt of transmissions $T_{gn}$ through $T_{gn+m}$. The word "packet" is used broadly to represent any sequence of useful information and can include packets, frames, or other finite sequences of variable or fixed length.

A failsafe CPU 10 of a stored control program transfers packets $T_{gn}$, $T_{gn+}$, ... $T_{gn+m}$ to a failsafe output unit 11 connected thereto or connected to another control program at the beginning of CPU cycle-time $Z_y$ at times $t_n$, $t_{n+1}$, ... $t_m$. respectively.

Output unit 11 checks, for example, the CRC values of each data packet and acknowledges the receipt of a data packet $T_{gn}$, $T_{gn+1}$, ... $T_{gn+m}$ CPU 10 within a monitoring time interval $Z_1$, with corresponding acknowledgment data packets $Q_{gn}$, $Q_{gn+1}$, ... $Q_{gn+m}$ each of which is also provided with a CRC value.

For purposes of example, it is assumed that CPU 10 and output unit 11 evaluate the number of corrupted and uncorrupted data packets within a specifiable time interval (e.g., in the interval from time $t_{n+1}$ and time $t_{n+m}$) and initiate a failsafe reaction should the relationship of corrupted to uncorrupted packets reach or exceed, for purposes of the present example, $1:10^5$, or another specified value according to a particular system's safety profile.

If packet $T_{gn}$ is corrupted, output unit 11 responds in a failsafe manner if the data packet $Tg_{n+m}$ (m$\leq 10^5$) is also a corrupted data packet. In addition, CPU 10 responds in a failsafe manner if, e.g., the acknowledgment data packets $Q_{gn+1}$ and $Q_{gn+m}$ (m $\leq 1+10^5$) are corrupted.

If CPU 10 does not receive an acknowledgment data packet within a CPU cycle period $Z_y$ after a data packet has been transmitted, CPU 10 assesses the missing acknowledgment as a corrupted acknowledgment data packet. In this case, CPU 10 responds in a failsafe manner as described if a further data packet transmission is not acknowledged or a further corrupted acknowledgment data packet of CPU 10 has been transmitted in accordance with the ratio between corrupted and uncorrupted data packets, or some other relative measure of data corruption. This correspondingly applies to data packets for which the peripheral unit is the transmitter and expects acknowledgments from the CPU 10.

In the following description, still corresponding to FIG. 2, it will be assumed for purposes of example that units 10 and 11 will initiate a failsafe reaction should the number of corrupted data packets exceed the number 2 within a specifiable time interval of one hour, which in the present example corresponds to the interval between times $t_{n+1}$ and $t_{n+m}$.

In the case where the data packet $T_{gn+1}$ is corrupted, therefore, output unit 11 responds in a failsafe manner if the received data packet $T_{gn+m}$ is also corrupted. Furthermore, the CPU unit 10 responds in a failsafe manner if, for example, the acknowledgment data packets $Q_{gn+1}$ and $Q_{gn+m}$ are corrupted since the predeterminable value "2" is reached.

In accordance with the manner described, CPU 10 assesses a missing acknowledgment within one CPU cycle period $Z_y$ as a corrupted acknowledgment data packet. In this case, CPU 10 responds in a failsafe manner as described if, in accordance with the value "2", a further data packet transmission within one hour, i.e. within the time interval between the times $t_{n+1}$ and $t_{n+m}$, is not acknowledged or a further corrupted acknowledgment data packet of CPU 10 is transmitted. Output unit 11, in turn, similarly assesses a missing acknowledgment.

If an embodiment is used in a link-up of a number of communication users (because the probabilistic safety requirements according to IEC 61508 always relate to a complete safety circuit), it can be provided, in accordance with a further aspect of the invention, that the error probabilities determined in essentially parallel communication branches are added and a failsafe reaction is triggered as soon as the sum of the error probabilities/error rates determined in the parallel communication relationships exceeds a predetermined or predeterminable threshold value.

Figure 3:
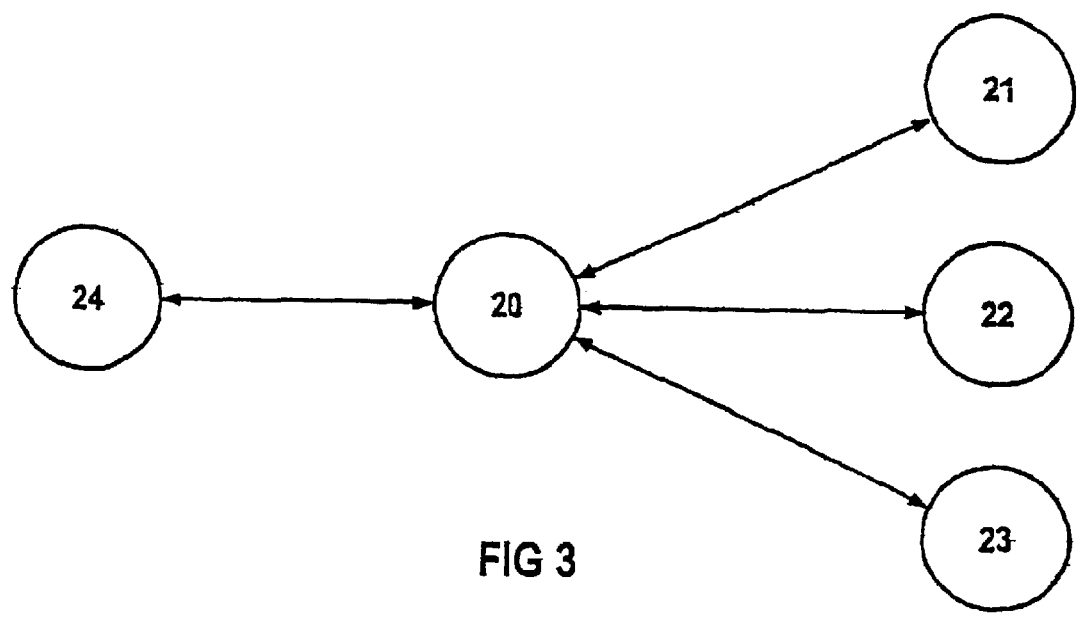
FIG. 3 shows a topology of a communications relationship in a failsafe system.

Another embodiment incorporating a multiple node system is elucidated with reference to FIGS. 3 and 4 in the following description. FIG. 3 schematically shows the communication relationship between a host 20, a analog/digital input unit 24 and a plurality of analog/digital output units 21, 22 and 23. The input unit 24 is, for example, an emergency off button 24. To the output units 21, 22 and 23 are connected different motors or hydraulic machines units of an external technical process to be controlled.

If emergency-off button 24 is used, it is essential in a safety-related system that all output units 21, 22, 23 initiate a switching-off of the peripheral process units connected, that is, it is essential that each device connected to an output unit 21, 22, 23 responds to the emergency-off situation signaled by the input unit 24. For this reason, the error probabilities/rates, which were determined in the manner described with reference to FIGS. 1 and 2 in the data traffic of the individual communication relationships (20–21), (20–22), (20–23), are transmitted to the host 20 which temporarily stores and adds together the received data. In addition, the host 20 can also add to this the data packet errors which it discovers during the process of receiving information about error rates. If the sum of the residual error probabilities/rates exceeds a predeterminable or predetermined threshold value, a failsafe reaction as described above, for example the shutdown of the peripheral process units connected to the output units 21, 22, 23, is initiated.

Figure 4:
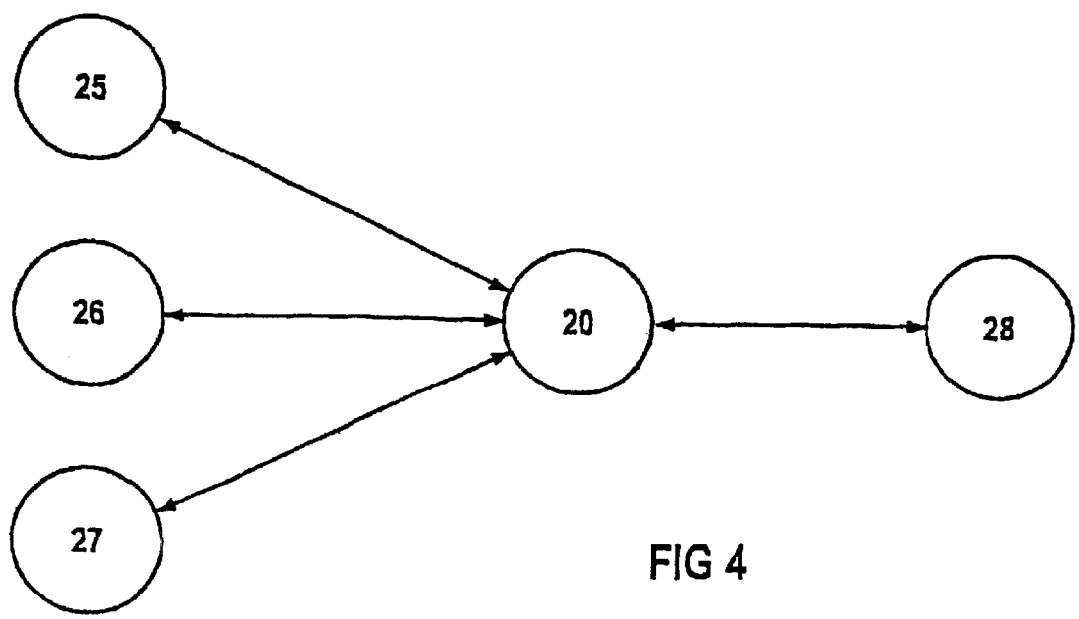
FIG. 4 shows a topology of a communications relationship in a failsafe system.

Another arrangement of communication relationships is shown in FIG. 4. In FIG. 4, host 20 (the same as in FIG. 3) is communicatively connected to an output unit 28 to which, for example, a motor is connected as external peripheral process unit. Similarly, host 20 is communicatively connected to input units 25, 26, 27. These input units are connected, for example, to sensors for protecting an electrical device, e.g. a safety mat, a light barrier, and an emergency-off key, as peripheral process units.

In the present example, if a status change is reported by any input unit 25, 26, 27, the peripheral process unit connected to the output unit 28 is switched off. Therefore, the error probabilities occurring in the communication relationships between the input units 25, 26, 27 and the host 20 are determined analogously to the example previously described with respect to FIG. 3, and transmitted to host 20. At host 20, the error probabilities/rates transmitted are added, and a failsafe reaction, e.g. the shutdown of the peripheral process unit connected to the output unit 28, is triggered as soon as the sum determined exceeds a predeterminable or predetermined threshold value.

The error probabilities/rates that the failsafe peripheral devices detect, are transmitted at the appropriate time in the appropriate packet(s) to host 20. Host 20 can also add any data errors received during this process to its stored record of errors.

Finally, a preferred embodiment of the present invention may be briefly summarized with the following description:

A network node, which can receive data packets through another network node, the data packets each featuring a data integrity value, said network node checking received data packets for corruption by means of the data integrity value, said network node possessing the means to make possible the online proof of data integrity with reference to a communication error probability/rate and/or a residual error probability/residual error rate.

FIGS. 1–4 and the description accompanying them illustrate the advantages and embodiments of the invention, exemplified here in a method for the online verification of data integrity, and apparati and systems useful therefore. The embodiments of the invention are envisioned to be particularly advantageous where the need for system safety is great, for example in manufacturing contexts where the safety of workers around heavy equipment is at issue, or in other contexts where the malfunction of machinery or other systems can have catastrophic consequences.

The disclosures of International Application PCT/E00/00118, filed on Jan. 13, 2000, and German application 29901302.2 filed on Jan. 26, 1999, including but not limited to the specification, drawings, claims and abstract are hereby incorporated by reference in their entireties.

What is claimed is:

1. A network node in a safety-related network, to which data packets can be transmitted by another network node, said data packets in each case comprising a data protection value, said node checking the data protection value of the data packet for detecting corruption of received data packets and addressing errors, comprising:

means for forming a relative measure of data corruption; and means for triggering a failsafe reaction should said relative measure of data corruption exceed a specifiable limit, characterized in that data packets and/or acknowledgment data packets which are provided with a data protection value can be transmitted to the network node, further characterized in that the network node assesses as a corrupted acknowledgment data packet an acknowledgment data packet which has not been received.

2. The network node of claim 1, characterized in that the data protection value is a CRC (cyclic redundancy check) value.

3. A method for facilitating safety in a communication network of a safety-related system, comprising the steps of:

forming for at least two network node pairs, a relative measure of data corruption, which comprises evaluating a complete safety circuit;

transferring information concerning said relative measure to a host;

generating at said host an overall measure of data corruption in a system, wherein the step of generating comprises summing individual data corruption rates for parallel communication relationships and utilizing data corruption detected during the step of transferring information concerning said relative measure to a host; and initiating a failsafe reaction if said overall measure of corrupted packets in a system exceeds a specifiable limit.

4. The method of claim 3, wherein said failsafe reaction includes the step of shutting down at least one peripheral process unit.

5. The method of claim 4, wherein the step of forming a relative measure of data corruption further comprises:

counting all received packets; and counting all corrupted packets.

6. The method of claim 5, wherein the step of forming a relative measure of data corruption further comprises:

starting a counter when a first corrupted data packet is received;

collecting a specifiable number of subsequent packets;

evaluating whether said subsequent packets are corrupted; and continuing to the step of initiating a failsafe reaction when a second corrupted packet is received within said specifiable number of subsequent packets.

7. A method for facilitating safety in a communication network of a safety-related system, comprising the steps of:

forming, for at least two network node pairs, a relative measure of data corruption, which comprises evaluating a complete safety circuit;

transferring information concerning said relative measure to a host;

generating at said host an overall measure of data corruption in a system; and initiating a failsafe reaction if said overall measure of corrupted packets in a system exceeds a specifiable limit, wherein said failsafe reaction includes the step of shutting down at least one peripheral process unit, wherein the step of forming a relative measure of data corruption further comprises:

counting all received packets and counting all corrupted packets, starting a counter when a first corrupted data packet is received;

collecting a specifiable number of subsequent packets;

evaluating whether said subsequent packets are corrupted; and continuing to the step of initiating a failsafe reaction when a second corrupted packet is received within said specifiable number of subsequent packets wherein the step of counting all corrupted packets further comprises using a data protection value.

8. A method for facilitating safety in a communication network of a safety-related system, comprising the steps of:

forming, for at least two network node pairs, a relative measure of data corruption, which comprises evaluating a complete safety circuit;

transferring information concerning said relative measure to a host;

generating at said host an overall measure of data corruption in a system; and initiating a failsafe reaction if said overall measure of corrupted packets in a system exceeds a specifiable limit, wherein said failsafe reaction includes the step of shutting down at least one peripheral process unit, wherein the step of forming a relative measure of data corrution further comprises:

counting all received packets and counting all corrupted packets, starting a counter when a first corrupted data packet is received;

collecting a specifiable number of subsequent packets;

evaluating whether said subsequent packets are corrupted; and continuing to the step of initiating a failsafe reaction when a second corrupted packet is received within said specifiable number of subsequent packets, wherein the step of counting all corrupted packets further comprises using a data protection value, further comprising transmitting a receipt packet in response to a received packet.

9. The method of claim 5, wherein the step of forming a relative measure of data corruption further comprises;

collecting a number of subsequent packets for a specified time interval after a first corrupted packet is received;

evaluating whether said subsequent packets are corrupted; and continuing to the step of initiating a failsafe reaction when a second corrupted packet is received within said specifiable time interval.

10. A method for facilitating safety in a communication network of a safety-related system, comprising the steps of:

forming, for at least two network node pairs, a relative measure of data corruption, which comprises evaluating a complete safety circuit;

transferring information concerning said relative measure to a host;

generating at said host an overall measure of data corruption in a system; and initiating a failsafe reaction if said overall measure of corrupted packets in a system exceeds a specifiable limit, wherein said failsafe reaction includes the step of shutting down at least one peripheral process unit, wherein the step of forming a relative measure of data corruption further comprises:

counting all received packets; and counting all corrupted packets, collecting a number of subsequent packets for a specified time interval after a first corrupted packet is received;

evaluating whether said subsequent packets are corrupted; and continuing to the step of initiating a failsafe reaction when a second corrupted packet is received within said specifiable time interval, wherein the step of counting all corrupted packets further comprises using a data protection value.

11. A method for facilitating safety in a communication network of a safety-related system, comprising the steps of:

forming, for at least two network node pairs, a relative measure of data corruption, which comprises evaluating a complete safety circuit;

transferring information concerning said relative measure to a host;

generating at said host an overall measure of data corruption in a system; and initiating a failsafe reaction if said overall measure of corrupted packets in a system exceeds a specifiable limit, wherein said failsafe reaction includes the step of shutting down at least one peripheral process unit, wherein the step of forming a relative measure of data corruption further comprises:

counting all received packets; and counting all corrupted packets, collecting a number of subsequent packets for a specified time interval after a first corrupted packet is received;

evaluating whether said subsequent packets are corrupted; and continuing to the step of initiating a failsafe reaction when a second corrupted packet is received within said specifiable time interval, wherein the step of counting all corrupted packets further comprises using a data protection value; further comprising the steps of:

transmitting a receipt packet in response to a received packet; and counting the failure of a receipt packet as a corrupted transmission.

* * * * *

UNITED STATES PATENT AND TRADEMARK OFFICE
CERTIFICATE OF CORRECTION

PATENT NO. : 6,907,542 B2  
DATED : June 14, 2005  
INVENTOR(S) : Barthel

It is certified that error appears in the above-identified patent and that said Letters Patent is hereby corrected as shown below:

Column 1,  
Line 44, delete "fü" and replace it with -- für --.  
Line 64, delete "p ovides" and replace it with -- provides --.

Column 2,  
Line 8, delete "there is a need for communication system" and replace it with -- there is a need for communication systems --.

Column 5,  
Line 56, delete "$T_{gn+,}$" and replace it with -- $T_{gn+1,}$ --.  
Line 63, delete "$Z_{l,}$" and replace it with -- $Z_{i,}$ --.

Column 7,  
Lines 59-60, delete "PCT/E00/00118" and replace it with -- PCT/DE00/00118 --.

Signed and Sealed this

Twenty-eighth Day of March, 2006

JON W. DUDAS  
*Director of the United States Patent and Trademark Office*